E. E. GOLD.
HOSE COUPLING.
APPLICATION FILED MAY 11, 1916.

1,213,094.

Patented Jan. 16, 1917.

WITNESSES:
René Buine
J. J. Wallace

INVENTOR:
Edward E. Gold
By Attorneys,
Fraser, Pink & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

HOSE-COUPLING.

1,213,094.  Specification of Letters Patent.  Patented Jan. 16, 1917.

Application filed May 11, 1916. Serial No. 96,766.

*To all whom it may concern:*

Be it known that I, EDWARD E. GOLD, a citizen of the United States of America, residing in the borough of Manhattan, city, county, and State of New York, have invented certain new and useful Improvements in Hose-Couplings, of which the following is a specification.

My invention relates to locks for positively locking in coupling position the mating couplers used for coupling together hose upon railway trains.

The invention is particularly adapted for use in coupling steam hose. Difficulty is experienced with steam hose couplers which are not coupled together by a positive lock, due to their becoming partly open, permitting the escape of steam, etc.

My invention has for its object to provide a simple, cheap and efficient positive lock which will hold the couplers firmly together in coupling position at all times; further, to provide a lock which will not get broken or easily get out of order, and which may be applied to couplers of differing constructions; further, it may be applied to couplers now in use without requiring a reconstruction thereof; further to provide a lock which will be self-adjusting as the parts wear so as to compensate for such wear and to hold the parts tightly together notwithstanding the wear.

The invention consists in providing the locking arm of the coupler with a longitudinally moving member which is inclined relative to the longitudinal axis of the coupler and which when moved in the said arm, will be forced into locking engagement relative to the lug on the body of the mating coupler and will hold the mating coupler members firmly in contact.

Figure 1:
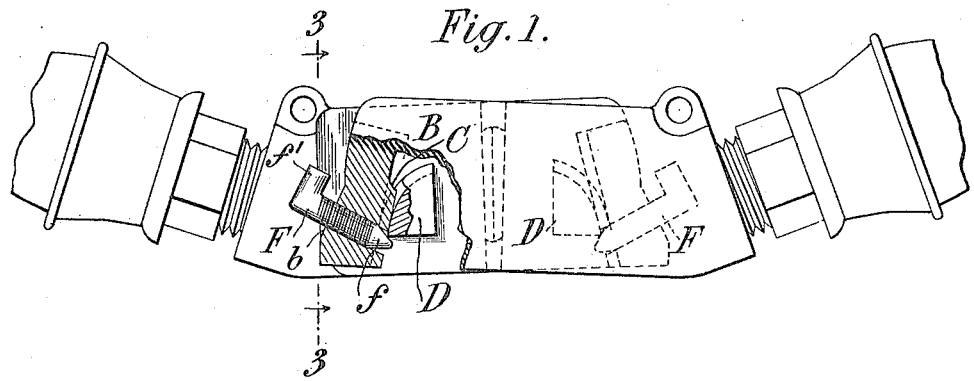
Figure 2:
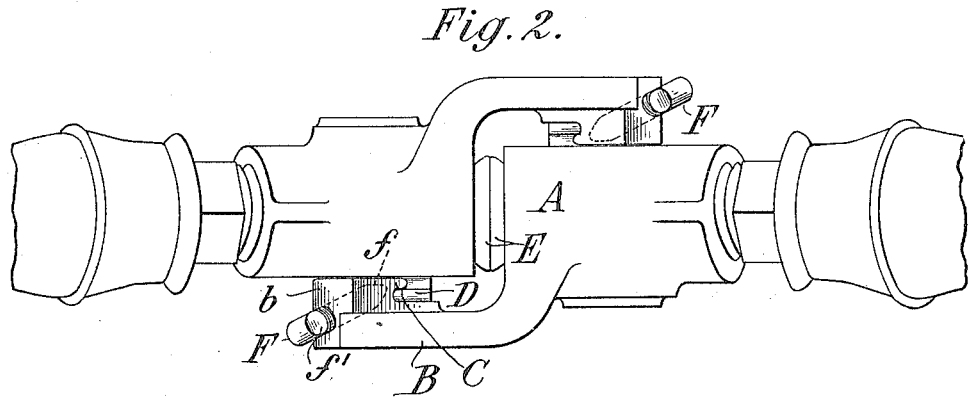
Figure 3:
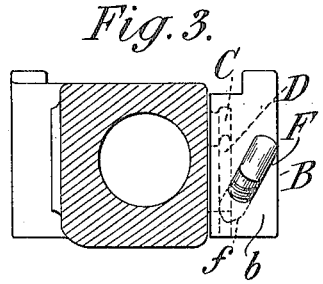
Figure 4:
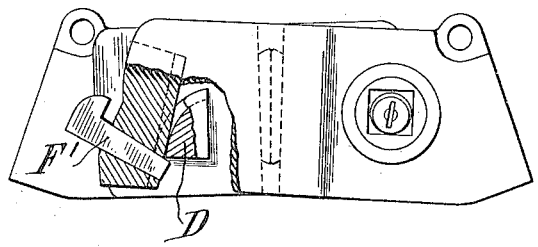

In the accompanying drawing, Figure 1 illustrates a side view partly in section of the preferred form of my invention applied to a pair of couplers. Fig. 2 is a plan view thereof. Fig. 3 is a section on the line 3—3, Fig. 1. Fig. 4 is a modified form of my invention.

My invention is illustrated as applied to the familiar Gold type of direct port couplers wherein two mating coupler-heads are employed which are duplicates, and each coupler has a body A provided with an arm B which is adapted to overlap the body of the mating coupler, and has a projection C which locks behind the lug D on the body of the said mating coupler. The couplers are assembled by placing the gaskets, E with which each coupler is provided, together and by swinging the arms B downwardly until the projections C engage behind the lugs D. To hold the said parts firmly in coupling position, I provided the end *b* of arm B with a positive lock F. The said lock consists of a longitudinally moving member which is located in a recess in the arm at an inclination relative to the longitudinal axis of the coupler and which when moved longitudinally in the recess in which it is mounted, will be forced into locking engagement with the lugs D and will firmly hold the said parts together so that the arm B may not be lifted and moved from locking engagement with the lug D.

In the preferred form in which my invention is illustrated, the longitudinally moving member is in the form of a screw-bolt which is threaded into the end *b* of the arm B and which at its forward end, or point *f*, is tapered, and which is provided with a head *f'* that is offset from the body-portion and provides a handle whereby the screw-bolt may be turned, as illustrated in the plan view, Fig. 2, and in the cross-section, Fig. 3. In Fig. 1 the screw-bolt F is illustrated as inclined relatively to the longitudinal axis of the coupler, and by this is meant that the tapered point *f* of the screw-bolt is located at a low part of the arm B so that it will pass under the lug D. The head *f'* is located nearer the top of the coupler arm and by this inclination in connection with the tapered point, a very quick take-up is provided so that the bolt F provides a quickly-acting and efficient positive lock for locking together the mating parts of the coupler. In the plan view, Fig. 2, and also in the cross-section, Fig. 3, the screw-bolt F is shown as being inclined in another direction, to wit, as having its head *f'* located at a greater distance from the mating coupler than its point *f*, and this inclination is to provide that the head shall be a sufficient distance from the mating coupler to enable it to be turned.

In Fig. 4 another form of my invention is illustrated. Here the locking member takes the form of a longitudinally movable bolt F¹ which is tapered and is located in the same relative position in the arm B as the screw-bolt F. The bolt F¹ is also inclined relatively to the longitudinal axis of the coupler, but it is not necessary that it should have the inclination of Figs. 2 and 3 whereby its head is brought farther from the body of the mating coupler than is its point, as in this form of my invention the locking bolt F¹ is forced to position by being driven in by blows from a tool. The forward end of the bolt F¹ which engages under the lug D, may have a slight additional taper upon its upper surface to provide a quick take-up, if desired; but, however, the said bolt is tapered throughout its length and will firmly force the lug and its connected coupler up and the arm to which it is attached downward until the gaskets are firmly and positively locked together.

I have illustrated in the accompanying drawing the most desirable manner of constructing my invention now known to me, but it will be apparent that this is not the only manner of constructing the invention, as the parts may be varied and equivalent devices substituted for those illustrated within the limits of the appended claims.

What I claim is:—

1. A lock for mating couplers, each having a body, a lug thereon and an arm carrying a projection and adapted to engage the lug on the mating coupler when coupled, said lock comprising a longitudinally moving bolt inclined relatively to the longitudinal axis of the coupler and mounted in a recess in said arm and adapted to engage beneath a portion of the lug on the mating coupler to prevent unlocking, and means for maintaining said bolt unyieldingly in locking position whereby a positive lock is produced.

2. In combination with mating hose couplers which have an extending arm, a projection thereon and a lug on the body of the mating coupler behind which the said projection is adapted to pass to hold the couplers together, means for positively locking the said couplers in coupling position, comprising a longitudinally moving bolt mounted in a recess in the said arm and inclined relatively to the longitudinal axis of the coupler, said bolt adapted to be moved in its recess to engage beneath a portion of the said lug and having its engaging surface tapered to provide a quick take-up and compensate for wear in the parts, and means for maintaining said bolt unyieldingly in locking position whereby a positive lock is produced.

3. In combination with hose couplers, each having a body, an extending arm thereon, a projection on said arm, and a lug on the coupler-body adapted to be engaged by the projection on the arm to hold the couplers together, means for positively locking the said couplers together, comprising a threaded bolt mounted in the said arm, and having an offset head forming a handle, and having its forward end tapered and adapted to be forced beneath a portion of the lug of the mating coupler in order to hold the said mating couplers in coupling position, and the head of said bolt being located nearer the outside of the arm than the point is, whereby the bolt is inclined horizontally relative to the longitudinal axis of the coupler and the said point is in position to engage the lug of the mating coupler and the head is in position for turning the bolt.

4. In combination with hose couplers, each having a body, an extending arm thereon, a projection on said arm, and a lug on the coupler-body adapted to be engaged by the projection on the arm to hold the couplers together, means for positively locking the said couplers together, comprising a threaded bolt mounted in the said arm and inclined vertically relative to the longitudinal axis of the coupler, and having its forward end tapered and adapted to be forced beneath a portion of the lug of the mating coupler in order to hold the said mating couplers in coupling position.

5. In combination with hose couplers, each having a body, an extending arm thereon, a projection on said arm, and a lug on the coupler-body adapted to be engaged by the projection on the arm to hold the couplers together, means for positively locking the said couplers together, comprising a threaded bolt mounted in the said arm and having an offset head forming a handle and said bolt inclined vertically and horizontally relative to the longitudinal axis of the coupler, and having its forward end tapered and adapted to be forced beneath a portion of the lug of the mating coupler in order to hold the said mating couplers in coupling position.

In witness whereof, I have hereunto signed my name in the presence of two subscribing witnesses.

EDWARD E. GOLD.

Witnesses:
HARRY C. POILLON,
T. W. DEARBORN.